K. F. LEES.
PNEUMATIC TIRE PRESSURE GAGE.
APPLICATION FILED JAN. 28, 1919.

1,328,572. Patented Jan. 20, 1920.

Inventor:
Kenneth F. Lees
by Ralw Ralw
Att'ys.

UNITED STATES PATENT OFFICE.

KENNETH F. LEES, OF NEW HAVEN, CONNECTICUT.

PNEUMATIC-TIRE PRESSURE-GAGE.

1,328,572.  Specification of Letters Patent.  Patented Jan. 20, 1920.

Application filed January 28, 1919. Serial No. 273,615.

*To all whom it may concern:*

Be it known that I, KENNETH F. LEES, a citizen of the United States, residing at New Haven, in the county of New Haven and State of Connecticut, have invented or discovered certain new and useful Improvements in Pneumatic-Tire Pressure-Gages, of which the following is a specification, reference being had therein to the accompanying drawing.

This invention relates to that class of tire test pressure gages intended to be permanently attached to the air inlet tubes of pneumatic tires, and the invention has for its object to provide a pressure gage of this class which is of comparatively simple construction, and which is specially made so as to indicate safety minimum and maximum air pressures for any particular tire to which it may be applied.

Figure 1:
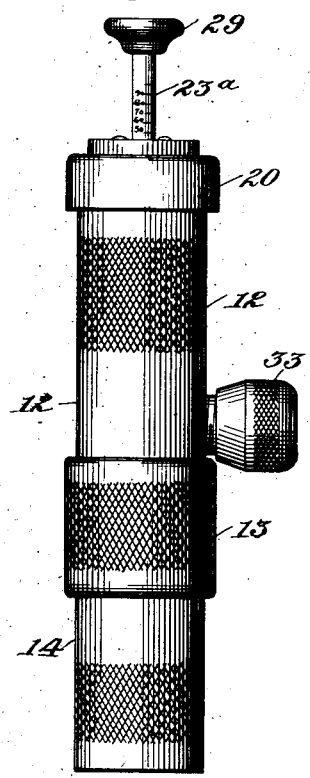
Figure 2:
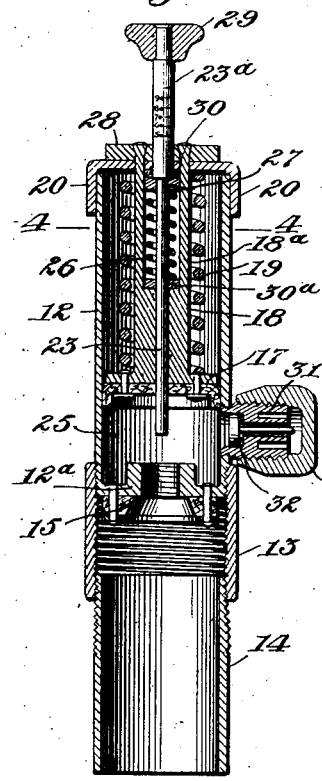
Figure 3:
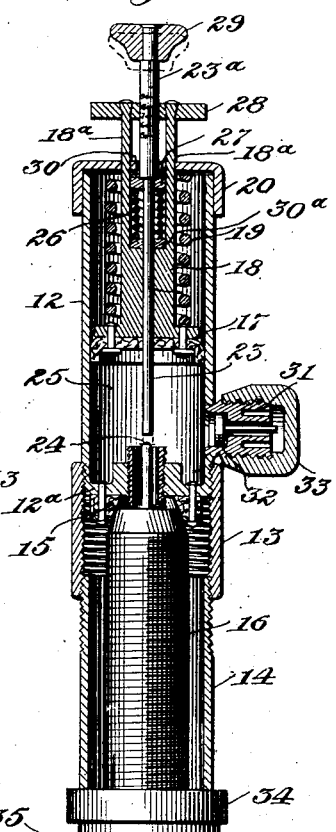
Figure 4:
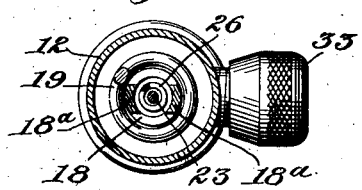

In the accompanying drawing Figure 1 is an elevation of the improved pressure gage. Fig. 2 is a vertical section of the same showing the parts in normal position, and Fig. 3 is a similar section illustrating the operation of the device attached to a tire valve stem. Fig. 4 is a detail section on line 4—4, Fig. 2, and Fig. 5 a detail of a preferred arrangement of pressure-indicating figures or characters.

Referring to the drawing, 12 denotes the main casing part and 13 a supplemental casing part or cylinder having a screw-threaded connection with the casing part 12. Formed integral with the casing part 12 is an internally screw-threaded bottom part 12$^a$ which is adapted to fit the screw-threaded nipple part of a pneumatic tire valve stem 16, so as to attach the pressure gage to said stem, said part 12$^a$ having an attached packing washer 15 to make an air-tight joint between said bottom part 12$^a$ and said valve stem. Fitting tightly within the casing part or cylinder 12 is a plunger or piston 17 comprising a usual cup leather. Surrounding the shank 18 of the said piston is a strong spring 19 interposed between the said piston and a cap 20 which is preferably permanently attached to the outer end of the casing part 12 and constitutes a cylinder head.

The piston shank 18 is bored out or formed hollow for the passage of a tire valve relief pin 23 which is arranged to register with the stem 24 of the tire valve, so that when the air pressure of a tire is to be tested the said pin 23 may be depressed to open the tire valve so as to admit compressed air into the chamber 25 of the casing part 12 and thus lift or force outward the piston 17. The piston shank 18 is counterbored at its top for the reception of a light spring 26 which is interposed between a collar 27 on the relief pin 23 and a shoulder part on the said piston shank, said spring serving to hold up the relief pin but permitting it to be depressed when the tire pressure is to be tested. The said spring 26 also serves as a pressure-resisting spring in holding down the piston 17, so that the stress of both springs 19 and 26 must be overcome by the tire air pressure when said piston is lifted.

Figure 5:
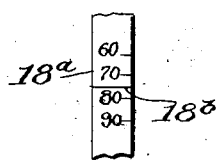

The outer or upper portion of the shank 18 is cut away to form two extensions 18$^a$ which project upward through holes in the cap 20 and are riveted at their tops to an index plate 28 which is thus lifted with the piston 17 when the tire pressure is to be tested. The upper enlarged portion 23$^a$ of the relief pin 23 may be provided with pressure-indicating figures which will be read in connection with the index plate 28 when the latter is lifted, and the said relief pin is preferably provided with a head or button 29 by which it may be conveniently depressed against the stress of the spring 26. Instead of providing the enlarged part 23$^a$ with pressure-indicating figures such figures may be placed on one or both of the extensions 18$^a$ of the piston shank 18, as indicated in Fig. 5, and this will be the preferable location of such figures. When the pressure-indicating figures are placed upon the extensions 18$^a$ of the piston shank 18 the top of the cap 20 will serve as the index in reading the pressure-indicating figures as the said extensions are lifted above the top of said cap.

A packing washer 30 is preferably interposed between the collar 27 and the inner wall of the cap 20 to make a tight joint around the relief pin at this point. A similar packing washer 30$^a$ will preferably be placed beneath the spring 26 on the shoulder of the piston shank to make a tight joint around the pin 23 at this point.

At one side of the casing part 12 is a screw-threaded nipple 31 to which an air tube may be attached when the pneumatic tire is to be inflated, said nipple being provided with a screw cap 33 and may contain a check valve 32, although such check valve is not really necessary.

In the use of the invention the pressure gage is attached to the valve stem 16 of a pneumatic tire, as shown in Fig. 3. In practice the auxiliary casing 13 will fit against a shoulder of a nut, as 34, on the rim 35 of the wheel, and when screwed down tightly against said shoulder will serve as a lock nut to hold the pressure gage in place. When the pressure gage is to be applied to a valve stem which projects to a considerable distance beyond the rim 35 of the wheel a second supplemental casing 14, as shown in the drawings, will be employed, and this supplemental casing 14 will serve as a lock nut when screwed tightly against the shoulder of a nut 34, as indicated in Fig. 3.

When the pressure is to be tested the relief pin 23 is depressed, as denoted by dotted lines in Fig. 3, to open the tire valve, as hereinbefore indicated, thus admitting air under pressure into the chamber 25 so as to lift the piston 17 and the index plate 28, the air pressure being indicated by the position of said index plate relative to the pressure-indicating figures on the upper part of the relief pin appearing above the top of the cap 20. Or if the extensions 18ª be provided with pressure-indicating figures or characters, which is preferred, the pressure will be denoted by the positions of such figures or characters relative to the top of the cap 20 which will serve as an index or pointer. When the piston is lifted the relief pin remains stationary, as the piston is movable independently of said pin, as will be understood, the latter being normally stationary.

The springs 19 and 26 are of sufficient strength so that their combined stress will not be overcome by an unsafe minimum pressure within the tire to which the pressure gage is applied. To this end, the relative positions, or spacing, of the piston 17 and index plate or stop member 28 are such that the spring 19 is held under a predetermined initial compression between said piston and the cylinder head 20 when said stop member is in engagement with said cylinder head, as shown in Fig. 2. From this it results that if, on depressing the valve relief pin 23, the gage fails to show any pressure at all, it will be understood that the pressure in the tire is unsafe or is below a safety running point. To indicate what may be termed a maximum safety pressure for any tire to which the pressure gage may be attached the part carrying the pressure-indicating figures may be provided with a red mark, as at 18ᵇ in Fig. 5. This maximum safety-indicating mark would be differently located for different sized tires, or for tires adapted to different air pressures, and in this way any safety pressure for any sized tire to which the gage is to be applied would be properly calibrated. Of course for different sized tires intended to carry different air pressures the stress of the springs 19 and 26 would also be properly varied so that a safety minimum pressure for any particular tire to which the gage may be applied would thus be properly calibrated.

As hereinbefore indicated, the improved pressure gage is intended to be permanently attached to the tire valve stem of a pneumatic tire, and when the valve in said stem is seated the piston in the pressure gage will be normally inactive and the index plate 28 will be in contact with the cap 20 and no tire pressure will be indicated. It is important, to prevent undue wear and strain on a pneumatic tire, that the air pressure therein should not fall below what is hereinbefore termed an unsafe minimum pressure, which of course will vary with different sizes and makes of tires and different weights to be carried by the tires, as otherwise the running of too soft a tire will result in undue wear thereon, and with too soft tires a car will require more power for propulsion, and waste of gasolene or other hydrocarbon used as fuel will accordingly result. It is therefore important that pneumatic tires should be frequently tested to determine whether or not the air pressure therein has fallen below an unsafe minimum, and in using this improved pressure gage this can be done quickly by depressing the relief pin 23; and if on so doing the tire air pressure is insufficient to overcome the stress of the properly graduated spring pressure against the piston the index plate 28 will not be lifted and it will thus instantly appear that the tire air pressure is below an unsafe minimum. It will therefore be apparent that a pressure gage provided with means for quickly and conveniently determining an unsafe minimum air pressure in a pneumatic tire is an important and valuable device, and that the present invention supplies such a device.

It, will, of course, be understood that, while the pressure responsive member is herein shown as a piston or plunger, any equivalent member held against movement under pressures below a predetermined amount, but adapted to yield under pressures exceeding such amount, may be employed if preferred.

Having thus described my invention I claim and desire to secure by Letters Patent:

1. In a tire pressure gage, the combination with a casing provided with means for attachment to a tire and with means whereby communication may be established between the interior of said casing and the interior of said tire, of a movable member within said casing and subjected to the pressure in the tire when such communication is established, means coöperating with said member for preventing pressure indicating movement thereof under pressures below a predetermined amount and for permitting such movement thereof when said amount is exceeded, and means operated by said member for indicating movement thereof.

2. In a tire pressure gage, the combination with a casing and normally inoperative means for at will establishing communication between the interior of said casing and the interior of the tire, of a movable member within said casing subjected to the pressure in the tire when said communication is established, means coöperating with said member for preventing pressure indicating movement thereof under pressures below a predetermined amount and for permitting such movement thereof when said amount is exceeded, and means operated by said member for indicating movement thereof.

3. In a tire pressure gage, the combination with a casing provided with means for attachment to a tire valve stem, of a plunger in said casing, a manually operated pin extending axially through said plunger for operating the tire valve to admit the pressure in the tire to said plunger, means coöperating with said plunger for preventing pressure indicating movement thereof under pressures below a predetermined amount and for permitting such movement thereof when said amount is exceeded, and means operated by said plunger for indicating movement thereof.

4. In a tire pressure gage, the combination with a casing provided with means for attachment to a tire and with means whereby communication may be established between the interior of said casing and the interior of said tire, of a movable member within said casing and subjected to the pressure in the tire when such communication is established, means coöperating with said member for preventing pressure indicating movement thereof under pressures below a predetermined amount and for permitting such movement thereof when said amount is exceeded, and means operated by said member for indicating movement thereof and for measuring the amount of such movement.

5. In a tire pressure gage, the combination with a casing provided with means for attachment to a tire and with means whereby communication may be established between the interior of said casing and the interior of said tire, of a movable member within said casing and subjected to the pressure in the tire when such communication is established, means including a spring under a predetermined initial tension for preventing movement of said member under pressures below a predetermined amount and for permitting such movement thereof when said amount is exceeded, and means operated by said member for indicating movement thereof.

6. In a tire pressure gage, the combination with a cylinder provided at its outer end with a head and at its inner end with means for attachment to a tire, said cylinder having means whereby communication may be established between the interior thereof and the interior of said tire, of a piston in said cylinder having a shank extending through said cylinder head, a spring interposed between said piston and cylinder head, and a stop member carried by said shank at the exterior of said cylinder head, the spacing of said piston and stop member being such as to cause said spring to be held between said piston and head under an initial compression sufficient to prevent movement of said piston under pressures below a predetermined amount but to permit such movement when said amount is exceeded.

7. In a tire pressure gage, the combination with a cylinder having at its outer end a head and at its inner end means for attachment to a tire valve stem, of a piston in said cylinder having a shank extending through said cylinder head, a spring interposed between said piston and said head, a stop member carried by said shank at the exterior of said head, the relative positions of said piston and stop member with respect to said cylinder head being such as to hold said spring under a predetermined initial compression between said piston and head, and a manually operated pin extending axially through said stem and adapted to engage and open the tire valve to admit the pressure in the tire to said cylinder beneath said piston.

8. In a tire pressure gage, the combination with a cylinder having at its outer end a head and provided at its inner end with means for attachment to a tire and with means whereby communication may be established between the interior thereof and the interior of said tire, of a piston in said cylinder having a shank extending through said head, a spring interposed between said piston and head, and a stop member carried by said shank at the exterior of said head, the relative spacing of said piston and stop member with respect to said cylinder head being such as to hold said spring under a predetermined initial compression between said piston and head, and said shank being provided with graduations coöperating with said head when said piston is moved to measure the amount of movement thereof.

In testimony whereof I affix my signature.

KENNETH F. LEES.